No. 613,566. Patented Nov. 1, 1898.
J. W. FARRAND.
DEVICE FOR MEASURING DISTANCES.
(Application filed June 23, 1897.)
(No Model.)
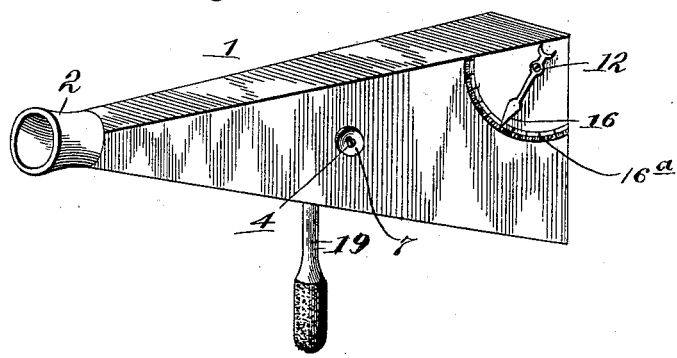
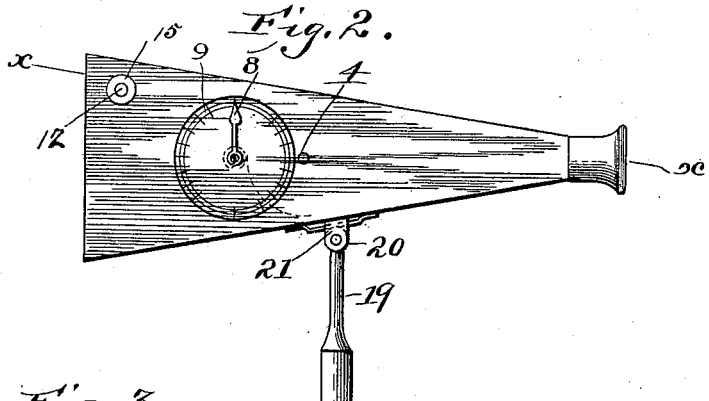
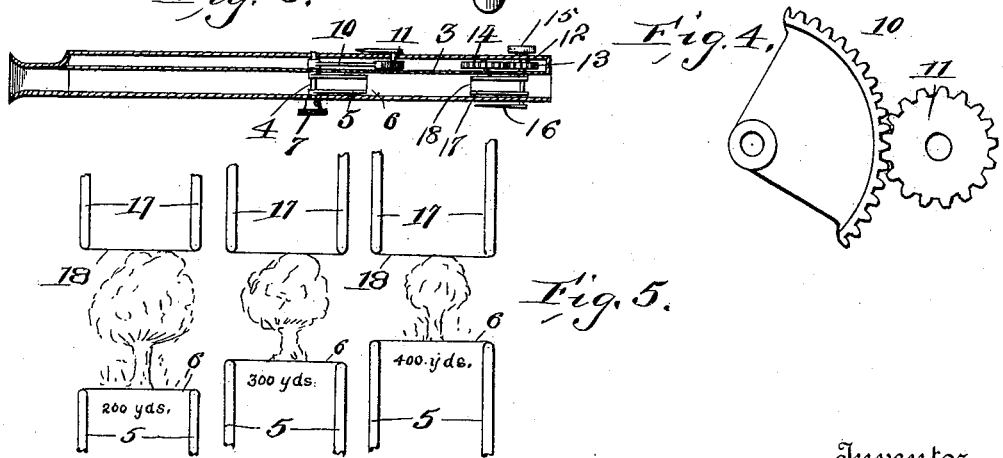
Witnesses
Wm H Edwards Jr
Victor J. Evans
Inventor
James W. Farrand.
by John Wedderburn
Attorney

UNITED STATES PATENT OFFICE.

JAMES W. FARRAND, OF EL PASO, TEXAS, ASSIGNOR OF ONE-HALF TO ATHANASE PROUSSALY, OF SAME PLACE.

DEVICE FOR MEASURING DISTANCES.

SPECIFICATION forming part of Letters Patent No. 613,566, dated November 1, 1898.

Application filed June 23, 1897. Serial No. 641,966. (No model.)

*To all whom it may concern:*

Be it known that I, JAMES W. FARRAND, of El Paso, in the county of El Paso and State of Texas, have invented certain new and useful Improvements in Devices for Measuring Distances; and I do hereby declare the following to be a full, clear, and exact description of the invention, such as will enable others skilled in the art to which it appertains to make and use the same.

This invention relates to a device for assisting the naked eye in ascertaining the distance of an object from a certain point; and it consists, essentially, of a triangular box with an open eyepiece at its apex and containing adjustable hairs or black wires, one of which is an object-sight and the other a distance-gage and respectively coacting with scales representing feet and yards.

The invention further consists of the details of construction and arrangement of the several parts, which will be fully hereinafter described and claimed.

The object of the invention is to provide means for assisting civil engineers, army officers, artists, sportsmen, and others to quickly and accurately determine the distance of an inanimate object from a fixed point and used by the naked eye in a simple and effective manner to dispense with mathematical calculations, triangulations, or methods of complex mensuration.

In the accompanying drawings, Figure 1 is a perspective view of the device embodying the invention. Fig. 2 is a side view of the device looking toward the side opposite to that shown by Fig. 1. Fig. 3 is a horizontal section on the line $x$ $x$, Fig. 2. Fig. 4 is a detailed elevation of one of the sights and a part of the coacting devices. Fig. 5 is a diagrammatic view illustrating the appearance of an object at various distances when gaged by the operator.

Referring to the drawings, wherein similar numerals of reference are employed to indicate corresponding parts in the several views, the numeral 1 designates a triangular box having an open eyepiece 2 at its apex and a longitudinal partition 3 dividing the said box into two compartments, one of which contains the working mechanism and the other the sights by which the observations are taken. At or about the center of the box a transverse rotatable rod 4 is mounted and has projecting therefrom a pair of parallel arms 5 of equal length and supporting at their outer ends a fine hair or black wire 6. On the right end of said rod 4 an exteriorly-situated milled button or head 7 is fixed, and on the opposite end an indicator 8 is secured and mounted over a scale 9, secured against the adjacent portion of the outer surface of the box. On said rod 4 a gear-wheel 10 is secured and meshes with an adjacently-situated pinion 11, the said parts acting to sustain the rod 4 and the arms and sight carried thereby in adjusted position, the pinion controlling the indicator, which has to travel over more space than the arms. Also the scale-plate with which the indicator 8 operates is divided and marked to represent yards, and in advance of the sight just described and located in the upper part of the box is another rotatable rod 12, also extending transversely across the box and having engagement with gears 13 and 14 at one end for sustaining its adjustment, and in this instance also the opposite end is provided with a milled button or head 15 and an indicator 16, attached by gear to the rod 12 and adjustable over a scale $16^{a}$ on the left-hand side of the box and representing feet. The rod 12 is also provided with a pair of parallel arms 17, supporting a fine hair or black wire 18 at their free ends and constructing a sight similar to that heretofore described. The first sight further constitutes a gage to determine the number of yards distant an object may be, and the second sight is an object-sight fixed at the known altitude of the object being observed. The gears in connection with the rods 4 and 12 are located between the partition 3 and the farther side of the box, and thereby entirely covered. On the under side of the box is attached a supporting-handle or grip, which consists of a bar or strip 19 of suitable material, pivotally attached at its front end on a support 20, having a spring in connection therewith coacting with said bar or strip similar to a clasp-knife, and at its rear end the said bar or strip is formed with a projection 21 for convenience in opening the same and arranging it for supporting the box in finding a range or in making an observation. At the apex of the box is an open eyepiece communicating with the compartment containing the sights and which will be constructed in such manner as to be easily applied to the eye with comfort and convenience.

In operating the gage-sight it is elevated by the button 7 to bring the hair or wire carried thereby on a level with the base of the object being observed, and while this operation is ensuing the indicator 8 is moving over its scale-plate 9 and will designate the number of yards the object is distant from the point of observation. The object-gage is first operated through its button to cause the hair or wire carried thereby to be sighted on a level with the highest known or estimated point from the object's base. It will thus be seen that the two hairs or wires on the sights coact relatively, the one in alinement with the base of the object and the other with the highest point thereof. In making observations the lines of visual angles are diverged by the sights when arranged as set forth and appear as they would if the observer were standing near the object, the scale being relatively arranged through the medium of predetermined calculations to accurately and automatically determine the number of yards distant of the object.

The device as thus arranged is specially useful for surveyors, army officers, or soldiers, and others who desire to ascertain the distance of an object from a certain point, and is therefore adapted for taking the range for gunners and also to determine the length of grades or irregularities in plane surfaces without requiring mathematical calculations or resorting to triangulation. Furthermore, the instrument in its entirety being small and compact in form can be readily carried in the pocket.

It is obviously apparent that many minor changes in the details of construction might be made and substituted for those shown and described without in the least departing from the nature or spirit of the invention.

Having thus described the invention, what is claimed as new is—

1. A device for ascertaining distances, consisting of a triangular box having an open unobstructed eyepiece at its apex and provided with a segmental scale on the one side at the front upper portion of the latter, and a circular scale on the opposite side in rear of the aforesaid scale, an object-sight in the upper front portion of the box adapted to have its movement registered by the segmental scale, a gage-sight in rear of the said object-sight and operated from the bottom of the box, the movements of the said gage-sight being registered on the circular scale, and indices connected to said sights and movable over the said scales, substantially as described.

2. In a device for measuring distances, a box, an object-sight in the upper front portion of the box, a gage-sight in rear of said object-sight, the said sights comprising pairs of parallel arms having their free ends connected by wires or hairs, and scales with which the said sights coact located on opposite sides of the box, substantially as described.

In testimony whereof I have signed this specification in the presence of two subscribing witnesses.

JAMES W. FARRAND.

Witnesses:
J. R. BLACKER,
R. M. KEATING.